(12) United States Patent
Kim et al.

(10) Patent No.: US 11,752,878 B2
(45) Date of Patent: Sep. 12, 2023

(54) METHOD AND APPARATUS FOR CONTROLLING A MULTI-MODE POWERTRAIN SYSTEM OF A VEHICLE

(71) Applicant: GM GLOBAL TECHNOLOGY OPERATIONS LLC, Detroit, MI (US)

(72) Inventors: Min-Joong Kim, Troy, MI (US); Debanjan Deep, Troy, MI (US); Jinming Liu, Troy, MI (US); Anno Yoo, Rochester, MI (US); Daniel J. Berry, Macomb Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 462 days.

(21) Appl. No.: 17/034,445

(22) Filed: Sep. 28, 2020

(65) Prior Publication Data
US 2022/0097531 A1    Mar. 31, 2022

(51) Int. Cl.
*B60L 15/20* (2006.01)
*B60K 1/04* (2019.01)
(Continued)

(52) U.S. Cl.
CPC ............... *B60L 15/20* (2013.01); *B60K 1/02* (2013.01); *B60K 1/04* (2013.01); *B60L 7/10* (2013.01);
(Continued)

(58) Field of Classification Search
CPC .......... B60L 1/003; B60L 11/00; B60L 15/20; B60L 53/20; B60L 7/10; B60K 1/02; B60K 1/04; B60R 16/03; G07C 5/0808
(Continued)

(56) References Cited

U.S. PATENT DOCUMENTS 9,088,231 B2 * 7/2015 Schulz .................... H02P 27/06
9,517,706 B2 * 12/2016 Kim ........................ B60L 50/15
(Continued)

FOREIGN PATENT DOCUMENTS

CN        102398507 A    4/2012
CN        107021090 A    8/2017
(Continued)

OTHER PUBLICATIONS

Y. Li, Z. Li, S. Zhu, M. Jiao and C. Wu, "Junction temperature post-fault analysis of single IGBT short-circuit for double-side cooling inverter used for electric vehicle," 2017 IEEE Inter Electric Machines and Drives Conf. (IEMDC), Miami, FL, USA, 2017, pp. 1-6, doi: 10.1109/IEMDC.2017.8002004 (Year: 2017).*
(Continued)

*Primary Examiner* — Cuong H Nguyen
(74) *Attorney, Agent, or Firm* — Quinn IP Law

(57) ABSTRACT

A vehicle is described that includes a multi-mode powertrain system having a first drive unit and a second drive unit. A controller is arranged to monitor the high-voltage DC power bus and is in communication with and operatively connected to first and second inverters. The controller is able to detect operation of one of the first inverter or the second inverter in an uncontrolled generating (UCG) mode, determine a driveline torque associated with the operating of the one of the first inverter or the second inverter in the UCG mode, and determine a compensating torque that is needed to counteract the driveline torque associated with the operating of the one of the first inverter or the second inverter in the UCG mode. The controller can further operate to detect a fault that may induce unintended lateral motion (ULM), and control torque outputs of the inverters based thereon.

20 Claims, 5 Drawing Sheets

(51) Int. Cl.
  *B60L 53/20*   (2019.01)
  *B60R 16/03*   (2006.01)
  *B60L 7/10*    (2006.01)
  *G07C 5/08*    (2006.01)
  *B60K 1/02*    (2006.01)
  *B60L 1/00*    (2006.01)

(52) U.S. Cl.
  CPC .............. *B60L 53/20* (2019.02); *B60R 16/03* (2013.01); *G07C 5/0808* (2013.01); *B60L 1/003* (2013.01)

(58) Field of Classification Search
  USPC .......................................................... 703/22
  See application file for complete search history.

(56) References Cited

U.S. PATENT DOCUMENTS

| | | | | |
|---|---|---|---|---|
| 10,718,598 | B2* | 7/2020 | Himmelmann | H02P 9/48 |
| 11,009,327 | B2* | 5/2021 | Himmelmann | F42B 19/22 |
| 2006/0061307 | A1* | 3/2006 | Donnelly | B60L 7/22 |
| | | | | 318/108 |
| 2014/0361717 | A1* | 12/2014 | Schulz | H02P 6/12 |
| | | | | 318/400.22 |
| 2016/0197503 | A1* | 7/2016 | Steigerwald | B60L 3/0069 |
| | | | | 320/107 |
| 2016/0250927 | A1* | 9/2016 | Wang | B60L 3/0061 |
| | | | | 307/10.1 |
| 2016/0332534 | A1* | 11/2016 | Kim | B60W 20/40 |

FOREIGN PATENT DOCUMENTS

| | | | | |
|---|---|---|---|---|
| CN | 107487230 | A | 12/2017 | |
| CN | 108602452 | A | 9/2018 | |
| CN | 109878345 | A | 6/2019 | |
| CN | 110001621 | A | 7/2019 | |
| FR | 2925618 | A1 * | 6/2009 | ............. B60K 6/485 |
| JP | 2010529920 | A * | 9/2010 | ............. B60L 50/16 |

OTHER PUBLICATIONS

R. Badawi, et al. "Impact of Vehicle Requirements on Accessory Power Module Design for Ultium Electric Vehicle Platforms," 2022 IEEE Energy Conversion Congress and Exposition (ECCE), Detroit, MI, USA, 2022, pp. 1-8, doi: 10.1109/ECCE50734.2022.9947504 (Year: 2022).*

A. Anu Priya and Dr. S. Senthil Kumar. Review on Converters used in Electric Vehicle Drive System. International Journal for Modern Trends in Science and Technology 2022, 9(01), pp. 01-09. https://doi.org/10.46501/IJMTST0901001 (Year: 2022).*

Analysis and Comparison on Motor Core Losses with Si-IGBT and SiC-MOSFET Inverter Excitations G. Nguyen et al.; 2018 IEEE International Magnetics Conference (INTERMAG) (Year: 2018).*

* cited by examiner

METHOD AND APPARATUS FOR CONTROLLING A MULTI-MODE POWERTRAIN SYSTEM OF A VEHICLE

TECHNICAL FIELD

This disclosure relates to electrified powertrain systems, and control associated therewith.

BACKGROUND

Electric machines such as multi-phase electric motor/generators have stator windings that are energized by alternating current from inverter modules that electrically connect to high-voltage DC electrical power buses. Electric machines may be employed as torque motors to supply propulsion torque to a vehicle driveline. Design and operating considerations related to employing electric machines as torque motors in vehicle systems include energy consumption, responsiveness and drivability.

Certain electric machines, including inverter-driven permanent magnet motors, may experience operation in an uncontrolled generation (UCG) mode, wherein an induced back electromotive force (EMF) exceeds a dc-link voltage found on a high-voltage bus. Such operating conditions may lead to having the electric machine generate uncontrolled electric power that is transferred to a high-voltage battery via the high-voltage bus under certain operating conditions. Such an operating state may increase likelihood of lithium plating on the high-voltage battery. Such an operating state may also increase likelihood of an unintended vehicle deceleration event when the electric machine is configured to supply propulsion torque as a part of a vehicle driveline. Furthermore, on certain vehicles employing multiple electric machines as torque motors for vehicle propulsion, a fault in at least one of the electric machines may result in unintended lateral motion (ULM) of the vehicle.

SUMMARY

A vehicle that includes a multi-mode powertrain system is described, and includes, in one embodiment, a high-voltage DC power source connected to a high-voltage DC power bus. The multi-mode powertrain system includes a first drive unit with a first inverter coupled to a first electric machine that is arranged to drive a first wheel associated with a first axle, and a second drive unit with a second inverter coupled to a second electric machine that is arranged to drive a second wheel associated with a second axle. A high-voltage DC power bus is connected to the first and second inverters. A controller is arranged to monitor the high-voltage DC power bus, and is in communication with and operatively connected to the first and second inverters. The controller includes an instruction set that is executable to detect operation of one of the first inverter or the second inverter in an uncontrolled generating (UCG) mode, determine a driveline torque associated with the operating of the one of the first inverter or the second inverter in the UCG mode, and determine a compensating torque that is needed to counteract the driveline torque associated with the operating of the one of the first inverter or the second inverter in the UCG mode. The other of the first inverter or the second inverter is controlled based upon the compensating torque.

An aspect of the disclosure includes the instruction set being executable to monitor a first electric power output from the first inverter and monitor a second electric power output from the second inverter, detect operation of the first inverter in the UCG mode when the first electric power output from the first inverter is greater than a first threshold, and detect operation of the second inverter in the UCG mode when the second electric power output from the second inverter is greater than a second threshold.

Another aspect of the disclosure includes the instruction set being executable to monitor a first voltage output from the first inverter, and detect operation of the first inverter in the UCG mode when the first voltage output from the first inverter is greater than a first threshold voltage, wherein the first threshold voltage is determined based upon the DC power source.

Another aspect of the disclosure includes the instruction set being executable to monitor a first current output from the first inverter, and detect operation of the first inverter in the UCG mode when the first current output from the first inverter is greater than a first threshold voltage, wherein the first threshold current is determined based upon the DC power source.

Another aspect of the disclosure includes the instruction set being executable to control the other one of the first inverter or the second inverter to cancel the driveline torque being generated by the operating of the first inverter or the second inverter in the UCG mode.

Another aspect of the disclosure includes the instruction set being executable to control the other one of the first inverter or the second inverter to control a net DC current on the high-voltage DC power bus within an allowable limit to prevent an over-voltage or over-current condition at the high-voltage DC power source.

Another aspect of the disclosure includes the instruction set being executable to disable operation of the first and second inverters in a regenerative braking mode.

Another aspect of the disclosure includes a method for controlling a multi-mode powertrain system for a vehicle, including arranging the multi-mode powertrain system to include a first drive unit having a first inverter coupled to a first electric machine that is coupled to a first driveline, wherein the first driveline is arranged to transfer torque to a first wheel associated with a first axle of the vehicle, and a second drive unit having a second inverter coupled to a second electric machine that is coupled to a second driveline, wherein the second driveline is arranged to transfer torque to a second wheel associated with a second axle of the vehicle. Operation of one of the first inverter or the second inverter in an uncontrolled generating (UCG) mode is detected, and driveline torque associated with the operating of the one of the first inverter or the second inverter in the UCG mode is determined. A compensating torque that is needed to counteract the driveline torque associated with the operating of the one of the first inverter or the second inverter in the UCG mode is determined, and the other of the first inverter or the second inverter is controlled based upon the compensating torque.

Another aspect of the disclosure includes the controller arranged to monitor the first drive unit and the second drive unit to detect a fault in the first drive unit, wherein the fault may induce unintended lateral motion (ULM) in the vehicle. Upon detecting a ULM-related fault, the controller is able to monitor a first rotational speed associated with the first vehicle wheel and a second rotational speed associated with the second vehicle wheel, and control torque output from the second drive unit based upon the first rotational speed and the second rotational speed.

Another aspect of the disclosure includes the instruction set being executable to determine that the first rotational speed is greater than a first threshold, and control the torque output from the second drive unit to at or near zero torque in response to detecting the fault associated with ULM in the vehicle.

Another aspect of the disclosure includes the instruction set being executable to control torque output from the second drive unit to be equal to the torque output from the first drive unit when a difference between the first rotational speed and the second rotational speed is greater than a threshold speed in response to detecting the fault associated with ULM in the first drive unit.

Another aspect of the disclosure includes the instruction set being executable to detect a fault in the second drive unit when a difference between the first rotational speed and the second rotational speed is less than a threshold speed in response to detecting the fault associated with ULM in the first drive unit.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

The appended drawings are not necessarily to scale and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure. For purposes of convenience and clarity, directional terms such as top, bottom, left, right, up, over, above, below, beneath, rear, and front, may be used with respect to the drawings. These and similar directional terms are not to be construed to limit the scope of the disclosure. Furthermore, the disclosure, as illustrated and described herein, may be practiced in the absence of an element that is not specifically disclosed herein.

As used herein, the term "system" may refer to one of or a combination of mechanical and electrical hardware, sensors, controllers, application-specific integrated circuits (ASIC), combinatorial logic circuits, software, firmware, and/or other components that are arranged to provide the described functionality.

Figure 1:
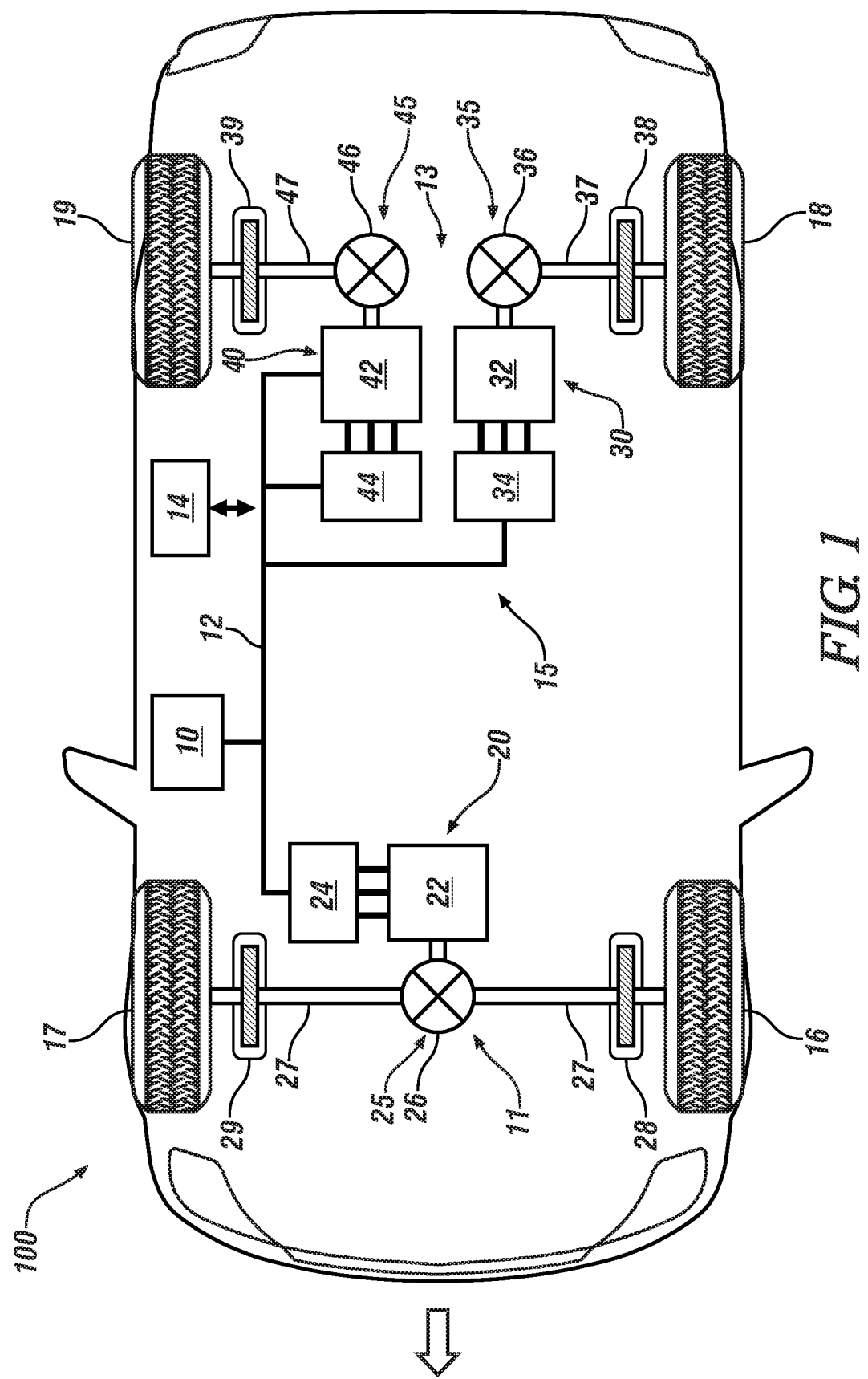
FIG. 1 schematically illustrates an embodiment of a vehicle including a multi-mode powertrain system that includes a first drive unit arranged to transfer torque to front wheels, a second drive unit arranged to transfer torque to a first rear wheel, and a third drive unit arranged to transfer torque to a second rear wheel of the vehicle, in accordance with the disclosure.
Figure 2:
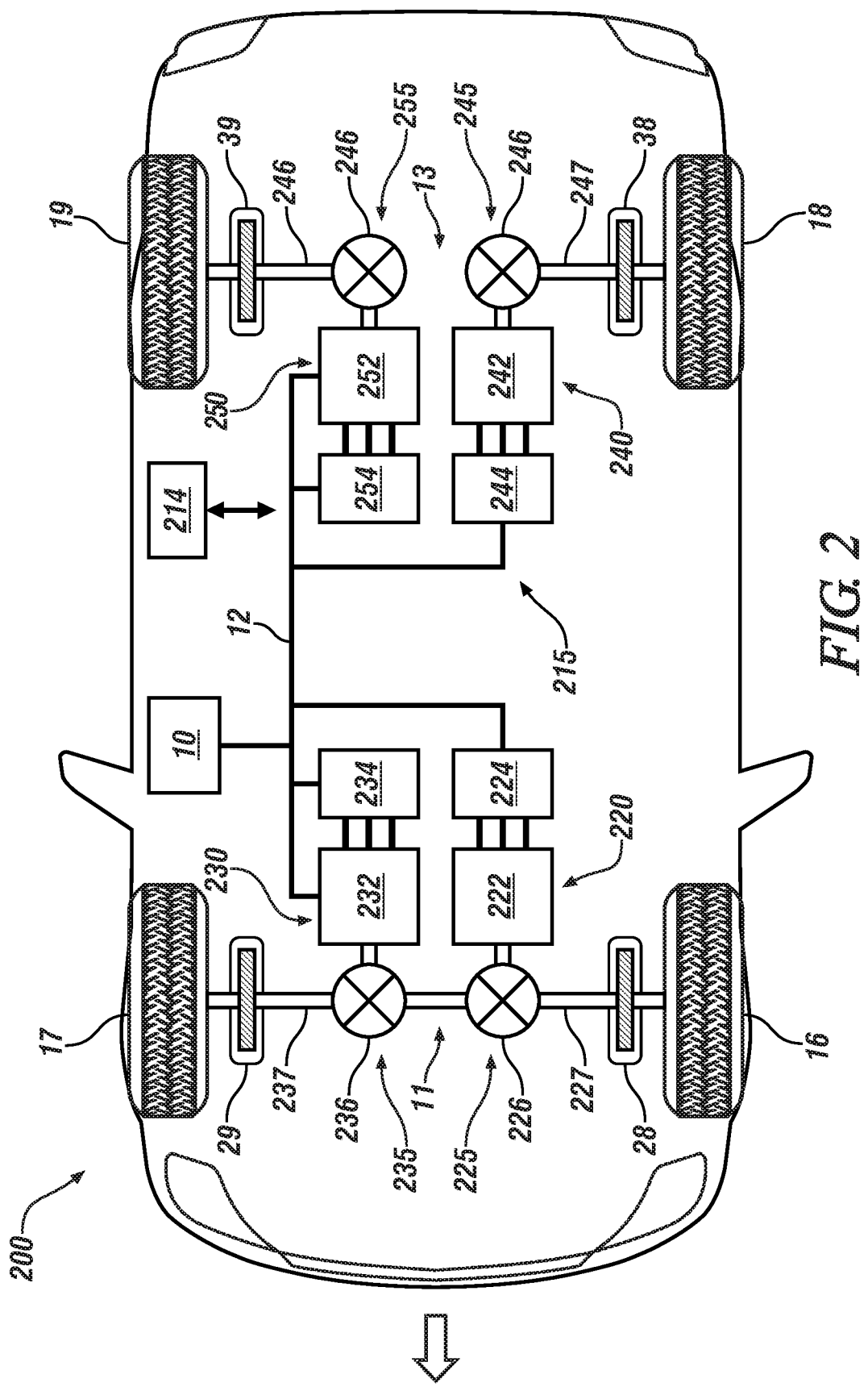
FIG. 2 schematically illustrates an embodiment of a vehicle including a multi-mode powertrain that includes a first drive unit arranged to transfer torque to a first front wheel, a second drive unit arranged to transfer torque to a second front wheel, a third drive unit arranged to transfer torque to a first rear wheel, and a fourth drive unit arranged to transfer torque to a second rear wheel of the vehicle, in accordance with the disclosure.
Figure 3:
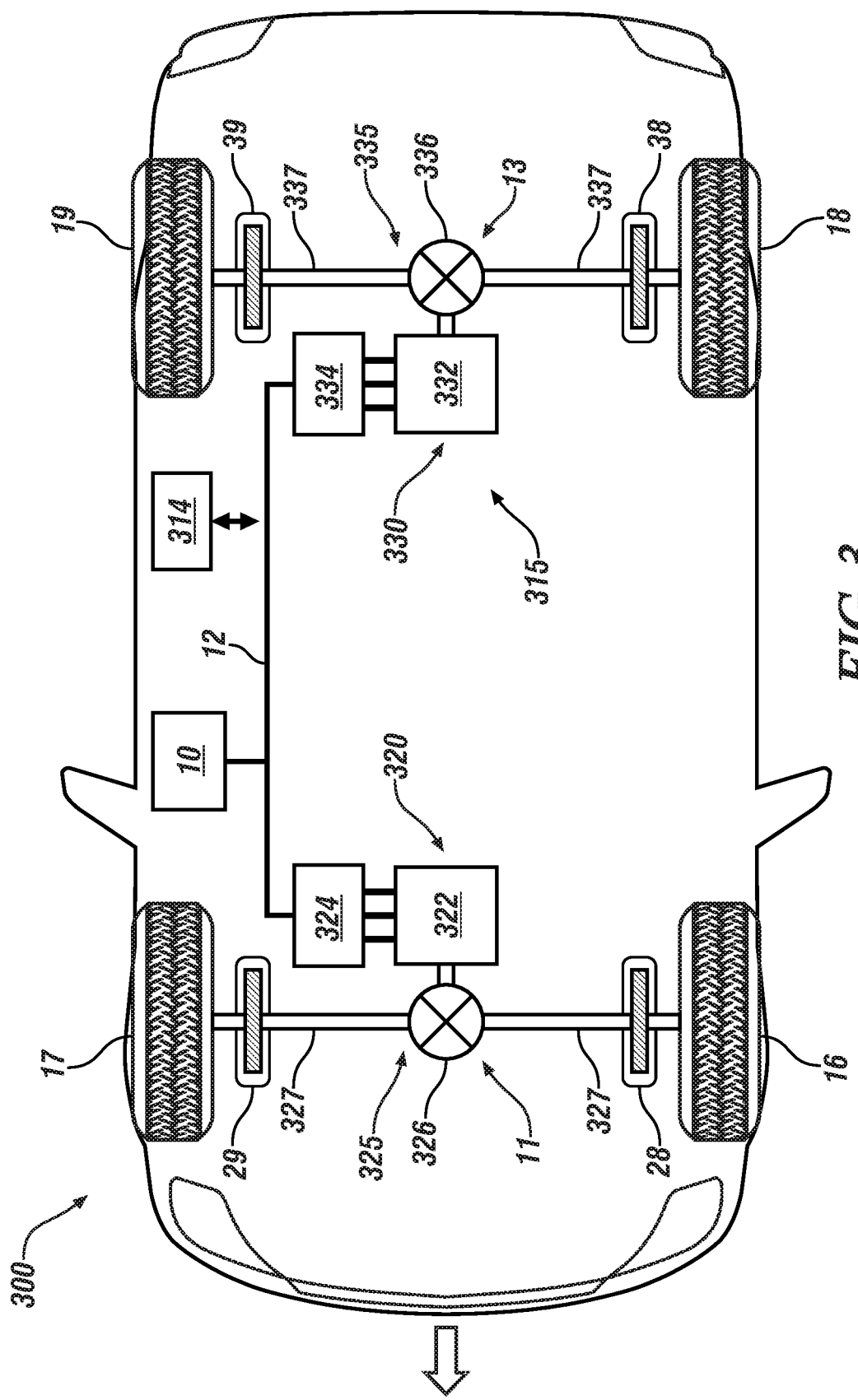
FIG. 3 schematically illustrates an embodiment of a vehicle including a multi-mode powertrain system that includes a first drive unit arranged to transfer torque to front wheels of the vehicle, and a second drive unit arranged to transfer torque to rear wheels of the vehicle, in accordance with the disclosure.

Referring to the drawings, wherein like reference numerals correspond to like or similar components throughout the several Figures, FIGS. 1, 2 and 3 schematically illustrate embodiments of an all-wheel (AWD) vehicle that includes a multi-mode electrified powertrain system that is arranged to simultaneously transfer propulsion torque to a plurality of drive wheels employing electrified drive units (hereafter "drive units") that employ electric machines as prime movers. The vehicle may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure. The illustrated drive wheels are non-limiting examples, and include a first, front axle 11 associated with a first, left-front (LF) wheel 16 and a second, right-front (RF) wheel 17; and a second, rear axle 13 associated with a third, left-rear (LR) wheel 18 and a fourth right-rear (RR) wheel 19. Furthermore, a high-voltage DC power source 10 is coupled to the first, second and third drive units 20, 30, 40 via a high-voltage bus 12. In one embodiment, the DC power source 10 is configured as a multi-cell lithium-ion device capable of charging and discharging under a range of conditions. The illustrated embodiments of multi-mode powertrain systems are shown for purposes of illustration. The concepts described herein may apply to various configurations of multi-mode powertrain systems including multiple drive units that are capable of AWD operation to transfer propulsion torque to one or more front wheels and one or more rear wheels simultaneously.

Referring now to FIG. 1, an AWD vehicle 100 that includes an embodiment of a multi-mode powertrain system 15 is schematically illustrated. The multi-mode powertrain system 15 includes a first drive unit 20, a second drive unit 30, and a third drive unit 40. A controller 14 is arranged to control operation of the multi-mode powertrain system 15. Operation of this embodiment of the AWD vehicle 100 including the multi-mode powertrain system 15 is controlled via an uncontrolled generating (UCG) mode mitigation routine 400 that is executed in the controller 14 and is described with reference to FIG. 4 to mitigate effects of UCG and unintended lateral motion (ULM) on the multi-mode powertrain system 15 and the DC power source 10 that may be caused by operation of the multi-mode powertrain system 15 as a result of a fault in the multi-mode powertrain system 15.

The first drive unit 20 includes a first electric machine 22 that is coupled to the LF wheel 16 and the RF wheel 17 via a first driveline 25 that includes, in one embodiment, a transaxle 26 and half-shafts 27. A first inverter 24 is coupled to the first electric machine 22, and electrically connected to the high-voltage DC power source 10 via the high-voltage bus 12. The controller 14 controls operation of the first drive unit 20 by controlling the first inverter 24. Friction brakes 28 and 29 are arranged to controllably brake the LF wheel 16 and the RF wheel 17, respectively, in response to a braking command.

The second drive unit 30 includes a second electric machine 32 that is coupled to the LR wheel 18 via a second driveline 35 that includes, in one embodiment, a differential 36 and a half-shaft 37. A second inverter 34 is coupled to the second electric machine 32, and electrically connected to the high-voltage DC power source 10 via the high-voltage bus 12. The controller 14 controls operation of the second drive unit 30 by controlling the second inverter 34. Friction brake 38 is arranged to controllably brake the LR wheel 18 in response to a braking command.

The third drive unit 40 includes a third electric machine 42 that is coupled to the RR wheel 19 via a third driveline 45 that includes, in one embodiment, a differential 46 and a half-shaft 47. A third inverter 44 is coupled to the third electric machine 42, and electrically connected to the high-voltage DC power source 10 via the high-voltage bus 12. The controller 14 controls operation of the third drive unit 40 by controlling the third inverter 44. Friction brake 39 is arranged to controllably brake the RR wheel 19 in response to a braking command.

FIG. 2 schematically illustrates an embodiment of an AWD vehicle 200 that includes another embodiment of a multi-mode powertrain system 215 that is arranged to simultaneously transfer propulsion torque to a plurality of drive wheels. A controller 214 is arranged to control operation of the multi-mode powertrain system 215. The multi-mode powertrain system 215 includes a first drive unit 220, a second drive unit 230, a third drive unit 240, and a fourth drive unit 250. The high-voltage DC power source 10 is coupled to the first, second, third and fourth drive units 220, 230, 240, and 250 via the high-voltage bus 12. The controller 214 is arranged to control operation of the multi-mode powertrain system 215. Operation of this embodiment of the AWD vehicle 200 including the multi-mode powertrain system 215 is controlled via the UCG mode mitigation routine 400 that is executed in the controller 214 and is described with reference to FIG. 4 to mitigate effects of UCG and unintended lateral motion (ULM) on the multi-mode powertrain system 215 and the DC power source 10 that may be caused by operation of the multi-mode powertrain system 215 as a result of a fault in the multi-mode powertrain system 215. The first drive unit 220 includes a first electric machine 222 that is coupled to the LF wheel 16 via a first driveline 225 that includes, in one embodiment, a transaxle 226 and a half-shaft 227. A first inverter 224 is coupled to the first electric machine 222, and electrically connected to the high-voltage DC power source 10 via the high-voltage bus 12. The controller 214 controls operation of the first drive unit 220 by controlling the first inverter 224. Friction brake 28 is arranged to controllably brake the LF wheel 16 in response to a braking command.

The second drive unit 230 includes a second electric machine 232 that is coupled to the RF wheel 17 via a second driveline 235 that includes, in one embodiment, a transaxle 236 and a half-shaft 237. A second inverter 234 is coupled to the second electric machine 232, and electrically connected to the high-voltage DC power source 10 via the high-voltage bus 12. The controller 214 controls operation of the second drive unit 230 by controlling the second inverter 234. Friction brake 29 is arranged to controllably brake the RF wheel 17 in response to a braking command.

The third drive unit 240 includes a third electric machine 242 that is coupled to the LR wheel 18 via a third driveline 245 that includes, in one embodiment, a transaxle 246 and a half-shaft 247. A third inverter 244 is coupled to the third electric machine 242, and electrically connected to the high-voltage DC power source 10 via the high-voltage bus 12. The controller 214 controls operation of the third drive unit 240 by controlling the third inverter 244. Friction brake 38 is arranged to controllably brake the LR wheel 18 in response to a braking command.

The fourth drive unit 250 includes a fourth electric machine 252 that is coupled to the RR wheel 19 via a fourth driveline 255 that includes, in one embodiment, a transaxle 256 and a half-shaft 257. A fourth inverter 254 is coupled to the fourth electric machine 252, and electrically connected to the high-voltage DC power source 10 via the high-voltage bus 12. The controller 214 controls operation of the fourth drive unit 250 by controlling the fourth inverter 254. Friction brake 39 is arranged to controllably brake the RR wheel 19 in response to a braking command.

FIG. 3 schematically illustrates an embodiment of an AWD vehicle 300 that includes another embodiment of a multi-mode powertrain system 315 that is arranged to simultaneously transfer propulsion torque to a plurality of drive wheels. A controller 314 is arranged to control operation of the multi-mode powertrain system 315. The multi-mode powertrain system 315 includes a first drive unit 320 and a second drive unit 330. The high-voltage DC power source 10 is coupled to the first and second drive units 320, 330 via the high-voltage bus 12. The controller 314 is arranged to control operation of the multi-mode powertrain system 315. Operation of one aspect of this embodiment of the AWD vehicle 300 including the multi-mode powertrain system 315 is controlled via the UCG mode mitigation routine 400 that is executed in the controller 314 and is described with reference to FIG. 4 to mitigate effects of UCG and unintended lateral motion (ULM) on the multi-mode powertrain system 315 and the DC power source 10 that may be caused by operation of the multi-mode powertrain system 315 as a result of a fault in the multi-mode powertrain system 315.

The first drive unit 320 includes a first electric machine 322 that is coupled to the LF wheel 16 and the RF wheel 17 via a first driveline 325 that includes, in one embodiment, a transaxle 326 and half-shafts 327. A first inverter 324 is coupled to the first electric machine 322, and electrically connected to the high-voltage DC power source 10 via the high-voltage bus 12. The controller 314 controls operation of the first drive unit 320 by controlling the first inverter 324. Friction brake 28 is arranged to controllably brake the LF wheel 16, and friction brake 29 is arranged to controllably brake and the RF wheel 17 in response to a braking command.

The second drive unit 330 includes a second electric machine 332 that is coupled to the LR wheel 18 and the RR wheel 19 via a second driveline 335 that includes, in one embodiment, a differential 336 and half-shafts 337. A second inverter 334 is coupled to the second electric machine 332, and electrically connected to the high-voltage DC power source 10 via the high-voltage bus 12. The controller 314 controls operation of the second drive unit 330 by controlling the second inverter 334. Friction brakes 38 and 39 are arranged to controllably brake the LR wheel 18 and the RR wheel 19 in response to a braking command.

Each of the aforementioned electric machines that are described with reference to FIGS. 1, 2, and 3 is configured as a multi-phase electric motor/generator, e.g., a multi-phase permanent magnet electric motor/generator, or alternatively, another electric motor/generator. Each electric machine includes a stator and a rotor, wherein the rotor is mechanically rotatably coupled to the associated driveline. Each of the electric machines is equipped with a rotational speed sensor to monitor rotational speed, wherein the rotational speed sensor may be a resolver or another rotational speed monitoring device. Each of the aforementioned inverters is configured as a power inverter module that is arranged to control electric power flow to the respective electric machine. The power inverter module includes a multi-phase inverter circuit and an inverter controller. The multi-phase inverter circuit electrically connects to the high-voltage DC power source 10 via the high-voltage DC power bus 12 that includes a positive bus element and a negative bus element. In one embodiment, the high-voltage DC power source 10 supplies DC electric power that is near 300V. The high-voltage DC power source 10 can include a high-voltage electrical energy storage device, e.g., a high-voltage battery or a capacitor, a high-voltage electric power generator or another related device or system. The multi-phase inverter circuit of the power inverter module includes a plurality of switch pairs that electrically connect in series across the elements of the high-voltage DC power bus 12. Each switch of the switch pairs may be a power transistor, e.g., an Insulated Gate Bipolar Transistor (IGBT), or another power transistor. Each of the switch pairs corresponds to a phase of the respective electric machine. The multi-phase inverter circuit preferably includes other electrical components including capacitors, resistors and other electrical circuit components to accomplish functions related to electrical noise suppression, load balancing and the like. High-voltage as used herein is understood to mean nominal voltage levels used primarily in propulsion applications for the vehicle, e.g., for high-voltage electric machines.

Figure 4:
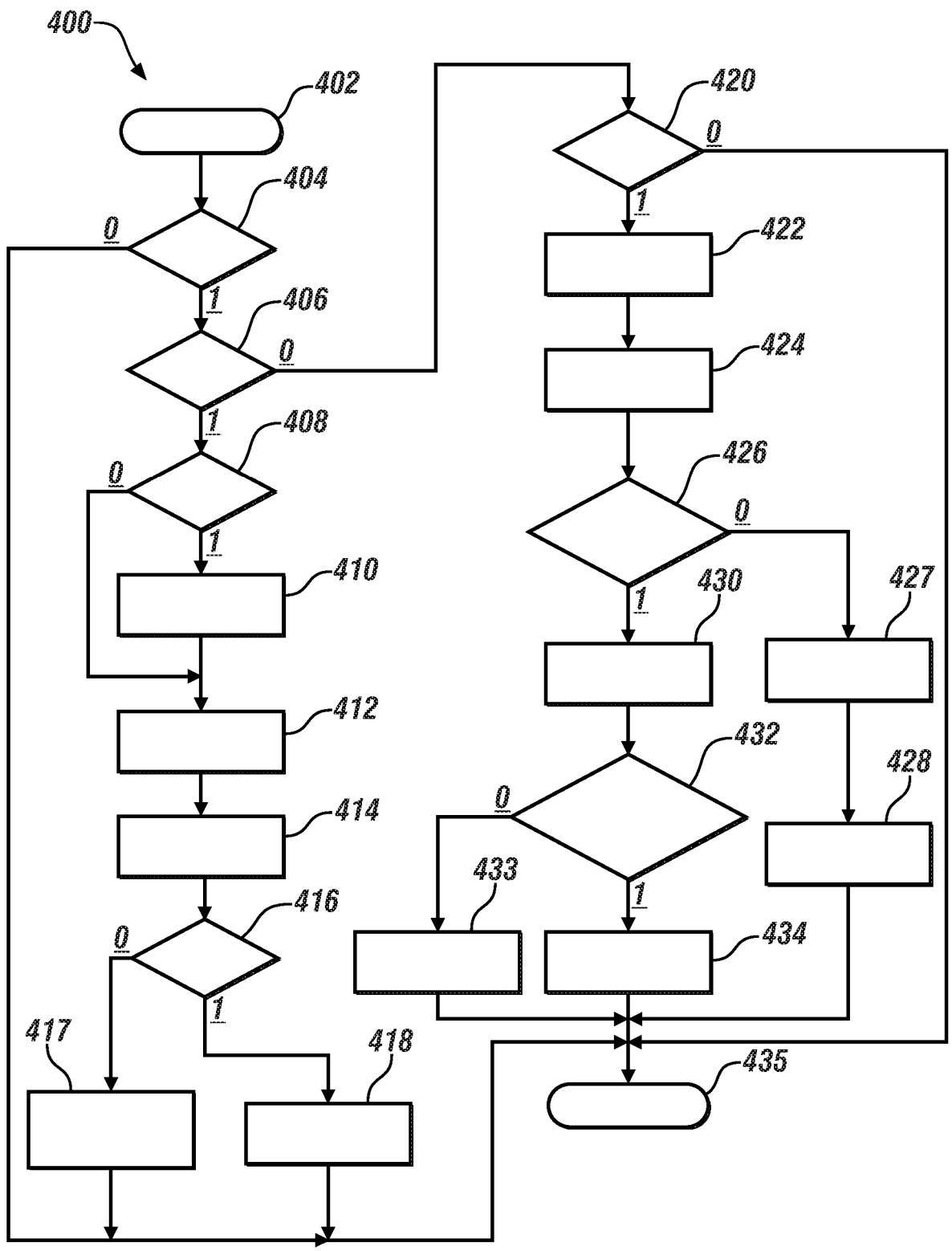
FIG. 4 schematically illustrates a process for controlling operation of an embodiment of a vehicle having a multi-mode powertrain system, including managing operation in an uncontrolled generating (UCG) mode and unintended lateral vehicle (ULM) motion, in accordance with the disclosure.

FIG. 4 schematically illustrates details related to the UCG mode mitigation routine 400 for controlling operation of an embodiment of an AWD vehicle, e.g., one of the AWD vehicles 100, 200, 300 described herein. The UCG mode mitigation routine 400 is illustrated as a collection of blocks in a logical flow graph, which represents a sequence of operations that can be implemented in hardware, software, or a combination thereof. In the context of software, the blocks represent computer instructions that, when executed by one or more processors, perform the recited operations. For convenience and clarity of illustration, the method is described with reference to the vehicle 100 shown in FIG. 1.

TABLE 1

| BLOCK | BLOCK CONTENTS |
|---|---|
| 402 | Monitor electric power on high-voltage bus |
| 404 | Fault detected? |
| 406 | Detect UCG event? |
| 408 | Did UCG event occur on an electric machine arranged on a 2 motor axle? |
| 410 | Execute 3-phase open state on non-faulty electric machine |
| 412 | Determine UCG torque |
| 414 | Determine compensating torque for electric machine driving another axle |
| 416 | Can electric machine driving other axle generate compensating torque? |
| 417 | Control electric machine to deliver compensating torque; employ friction brake |
| 418 | Disable regenerative braking; Use friction brake for vehicle stopping |
| 420 | Did UCG fault occur on two-motor axis? |
| 422 | Monitor rotational speeds of both electric machines |
| 424 | Monitor temperatures of both electric machines |
| 426 | Is rotational speed of electric machine associated with fault greater than a first threshold? |
| 427 | Detect 3-phase open fault in electric machine associated with fault |
| 428 | Command torque output from non-faulty electric machine equal to torque output from electric machine associated with fault (+/−ΔT2) |
| 430 | Detect 3-phase short fault in electric machine associated with fault |
| 432 | Is delta motor speed greater than second threshold? AND Is delta temperature greater than third threshold? |
| 433 | Detect 3-phase short at non-faulty electric machine |
| 434 | Command torque output from non-faulty electric machine to zero (+/−ΔT1) |
| 435 | End |

Execution of the UCG mode mitigation routine 400 may proceed as follows. The steps of the UCG mode mitigation routine 400 may be executed in a suitable order and are not limited to the order described with reference to FIG. 4. As employed herein, the term "1" indicates an answer in the affirmative, or "YES", and the term "0" indicates an answer in the negative, or "NO".

The UCG mode mitigation routine (hereafter "routine") 400 operates by monitoring electric power in the form of a voltage level and current level on the high-voltage bus 12 and at each of the inverter modules, with the intent being to detect a fault associated with one of the electric machines, including a fault that may lead to a UCG event (402), (404).

When no fault associated with one of the electric machines is detected (404)(0), this iteration of the routine 400 ends (435).

When a fault associated with one of the electric machines is detected (404)(1), it is determined whether a UCG event has occurred (406). A UCG event may be detected when electric power to battery cells of the high-voltage DC power source 10 is greater than a threshold power. The electric power to the cells includes a battery cell voltage and a battery cell current. The UCG event may be detected when the battery cell voltage is greater than a threshold battery cell voltage, and/or when the battery cell current is greater than a threshold battery cell current. Example thresholds are illustrated with reference to FIG. 5. By way of example, interior permanent magnet synchronous motors often work under flux weakening state for higher speed operation. However, faults such as overcurrent and overvoltage might occur during that process, after which the power transistors may be closed immediately. The battery packs are charged through three-phase uncontrolled rectifier composed of six fly-wheel diodes, resulting in operation in the UCG mode.

Furthermore, an UCG event may occur during specific operating conditions, including high-speed, low-load or no-load conditions, when the electric machine operates such that motor back-emf increases, resulting in a motor output voltage that is greater than voltage on the high-voltage bus. The excess output voltage may result in a charging current flow through one or more of the diodes arranged in parallel to the switches of the inverter. The charging current flow occurring during the UCG event may result in excess current through components of the respective inverter or overcharging of the high-voltage DC power source 10 that can negatively affect service life of the respective inverter or the high-voltage DC power source 12. By way of a non-limiting example, lithium ions may accumulate on a surface of an anode and be deposited as metallic lithium when the electrical current exceeds a design limit, such that lithium ions cannot be accommodated quickly enough between the intercalation layers of the carbon anode, referred to as lithium plating.

When a UCG event is detected (406)(1) after detection of a fault, the routine determines whether the UCG event is associated one of the drive units that is arranged in a configuration that includes two drive units separately providing propulsion torque to two opposed wheels of an axle (408). By way of example, this configuration includes the rear axle of vehicle 100 (shown with reference to FIG. 1), and the front and rear axles of vehicle 200 (shown with reference to FIG. 2).

When the configuration includes two drive units providing propulsion torque to two wheels of an axle (408)(1), the routine commands the inverter associated with the other, non-faulty drive unit to an open, freewheeling state (410).

Figure 5:
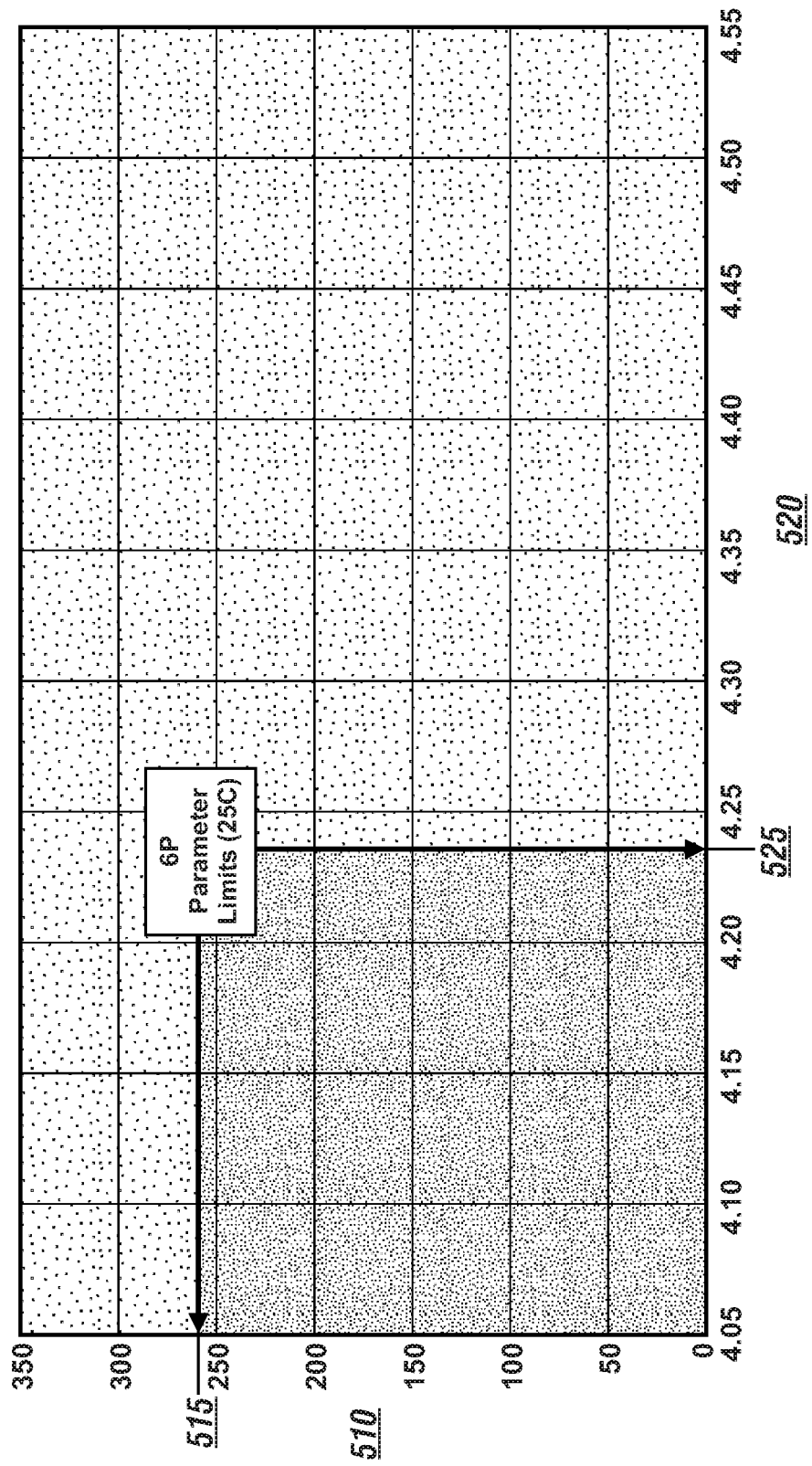
FIG. 5 graphically illustrates allowable regions of operation associated with a single battery cell in terms of cell current (amps) and cell voltage (V), including a threshold cell current and a threshold cell voltage, in accordance with the disclosure.

The routine estimates or otherwise determines a magnitude of UCG driveline torque, wherein the UCG driveline torque is associated with the magnitude of torque that is being generated by the respective drive unit as a result of operation in the UCG event (412). The routine determines a compensating torque (414), which is a magnitude of torque required to be delivered by the non-faulty drive unit to counteract the UCG driveline torque, and determines whether the non-faulty drive unit is capable of generating the compensating torque (416). When the non-faulty drive unit is not capable of generating the compensating torque (416)(0), the routine commands the non-faulty drive unit to generate torque to its maximum capability, and commands operation of the friction brakes to a magnitude of braking torque such that the UCG driveline torque is counteracted by the combination of the motor torque from the non-faulty drive unit and the friction brakes (417). The compensating torque is commanded to operate one or both the drive units associated with the other axle, i.e., the axle that is not associated with the UCG event. The compensating torque that is commanded to operate one or both the drive units associated with the other axle, i.e., the axle that is not associated with the UCG event serves to cancel the driveline torque being generated by the UCG event, and controls the net DC current to keep the DC voltage on the high-voltage bus within allowable limits, thus preventing an over-voltage condition or an over-current condition at the high-voltage DC power source. The over-voltage and over-current conditions are those conditions that exceed voltage and current design limits that are selected to minimize or prevent risk of lithium plating in the high voltage battery 10, in one embodiment. When the non-faulty drive unit is capable of generating the compensating torque (416)(1), the routine disables regenerative braking (418), and vehicle braking is generated exclusively by the friction brakes. FIG. 5 illustrates operating conditions under which regenerative braking may be enabled or disabled, based upon the electric power being delivered to the battery cells as a result of the UCG event. In some circumstances, this operation may continue until the vehicle speed achieves zero, i.e., stops forward motion, and the vehicle operation ends.

FIG. 5 graphically illustrates allowable regions of operation associated with a single battery cell in terms of cell current (amps) 510 and cell voltage (V) 520, including a threshold cell current 515 and a threshold cell voltage 525, which are associated with a UCG event. It is appreciated that the magnitudes of threshold cell current 515 and the threshold cell voltage 525 are temperature-dependent values.

When the magnitudes of the cell current and cell voltage associated with the UCG event are less than the respective threshold cell current 515 and threshold cell voltage 525, the compensating torque that is commanded to operate one or both the drive units associated with the other axle, i.e., the axle that is not associated with the UCG event, may be applied, including operating in regenerative braking mode.

However, when the magnitude of the cell current and/or the magnitude of the cell voltage associated with the UCG event is greater than the respective threshold cell current 515 and threshold cell voltage 525, the compensating torque that is commanded to operate one or both the drive units associated with the other axle, i.e., the axle that is not associated with the UCG event may be applied, including disabling operation in the regenerative braking mode.

The UCG mode mitigation routine 400 operates to keep the voltage and current on the high-voltage bus within the respective voltage and current design limits during operation in the UCG mode, and also to control an unintended deceleration rate to that which is experienced as a coast down rate. This serves to eliminate or mitigate a UCG event, thus protecting the affected inverter(s) and the DC power source without a need to introduce hardware modifications or redesigns. Furthermore, and directly, risk of lithium plating in the DC power source 10 may be eliminated or reduced, thus positively affecting service life of the DC power source 10.

When a UCG event is not detected (406)(0) after detection of a fault associated with one of the electric machines of one of the drive units, the routine 400 shifts to evaluating whether the detected fault may lead to unintended lateral vehicle motion that may be caused by operation of the multi-mode powertrain system. When a three-phase short or three-phase open fault occurs in one of the drive units of the multi-mode powertrain system, torque generation may be uncontrolled side to side, which may lead to unintended lateral motion. Steps 420-434 relate to monitoring the multi-mode powertrain system for occurrence of faults, and controlling operation of the drive units of the multi-mode powertrain system in response to mitigate and prevent unintended lateral vehicle motion. This includes monitoring various parameters associated with the multi-mode powertrain system for presence or occurrence of a fault in one of the drive units (420), wherein such a fault has the potential to induce unintended lateral motion (ULM) in the vehicle as a result of operation of the multi-mode powertrain system. Such faults are referred to hereinafter as ULM-inducing faults. ULM-inducing faults may include, by way of non-limiting examples, a short circuit or open circuit in one of the aforementioned inverters of one of the drive units, or a fault in the high-voltage bus.

When occurrence of a ULM-inducing fault is detected (420)(1), the system identifies which of the electric machines has experienced the ULM-inducing fault. Rotational speeds of the electric machines are monitored and evaluated (422), along with monitoring temperatures of the electric machines (424). Monitoring the rotational speeds of the electric machines may include monitoring rotational speeds of the electric machines, or monitoring vehicle wheel speeds for the respective drive unit, or a combination thereof. Monitoring temperatures of the electric machines may include monitoring temperatures at relevant locations on the electric machines employing thermocouples, thermistors, etc.

The rotational speed of the one of the electric machines that has experienced the ULM-inducing fault is compared to a first threshold (426).

When the rotational speed of the one of the electric machines that has experienced the ULM-inducing fault is less than the first threshold (426)(0), it is an indication that the fault is a three-phase open fault in the electric machine that has experienced the ULM-inducing fault (427), and the controller commands the torque output of the other drive unit that includes the non-faulty electric machine to zero, with an allowable torque error band fault (+/−ΔT2) (428), and this iteration ends (435).

When the rotational speed of the one of the electric machines that has experienced the ULM-inducing fault is equal to or greater than the first threshold (426)(1), it is an indication that the fault is a three-phase short fault in the electric machine that has experienced the ULM-inducing fault (430), and the controller continues monitoring as follows.

The controller determines an absolute value of a speed difference between the rotational speed of the electric machine that has experienced the ULM-inducing fault, and the rotational speed of the other, non-faulty electric machine. The controller also determines an absolute value of a temperature difference between the temperature of the electric machine that has experienced the ULM-inducing fault, and the temperature of the other, non-faulty electric machine (432).

When the absolute value of the speed difference is greater than a second threshold speed, and the absolute value of the temperature difference is greater than a threshold temperature (432)(1), the controller commands the torque output of the other drive unit including the non-faulty electric machine to be equivalent to the torque output of the drive unit including the electric machine that has experienced the ULM-inducing fault, with an allowable torque error band (+/−ΔT1) (434). The allowable torque error band allows some level of torque imbalance between the drive units, but avoids the ULM condition. This iteration then ends (435).

When the absolute value of the speed difference is less than the second threshold speed, or the absolute value of the temperature difference is less than the threshold temperature (432)(0), the controller determines that there is a three-phase fault in the other, non-faulty electric machine (433), and this iteration ends (435).

In this manner, the controller is able to control the torque outputs of the electric machines of the drive units of the multi-mode powertrain system in a manner that mitigates or prevents unintended lateral vehicle motion that may be caused by operation of the multi-mode powertrain system as a result of a fault in one of the drive units of the multi-mode powertrain systems that are configured as described with reference to FIGS. 1, 2 and 3. This is effective when the drive units of the respective multi-mode powertrain system are arranged to transfer torque to vehicle wheels that are disposed on opposed sides of the vehicle and capable to induce torque steer and/or unintended lateral vehicle motion.

The terms controller, control module, module, control, control unit, processor and similar terms refer to one or various combinations of Application Specific Integrated Circuit(s) (ASIC), electronic circuit(s), central processing unit(s), e.g., microprocessor(s) and associated memory and storage devices (read only, programmable read only, random access, hard drive, etc.) executing one or more software or firmware programs or routines, combinational logic circuit (s), input/output circuit(s) and devices, signal conditioning and buffer circuitry and other components to provide a described functionality. Software, firmware, programs, instructions, control routines, code, algorithms and similar terms mean controller-executable instruction sets including calibrations and look-up tables. Each controller executes control routine(s) to provide desired functions, including monitoring inputs from sensing devices and other networked controllers and executing control and diagnostic routines to control operation of actuators. Routines may be executed at regular intervals, for example each 100 microseconds during ongoing operation. Communications between controllers and between controllers, actuators and/or sensors may be accomplished using a direct wired link, a networked communications bus link, a wireless link or another suitable communications link.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A vehicle, comprising:
   first and second drive units electrically connected to a DC power source via a high-voltage DC power bus that is electrically connected to a DC power source;
   wherein the first drive unit includes a first inverter and a first electric machine coupled to a first driveline, wherein the first driveline is arranged to transfer torque to a front wheel of the vehicle;
   wherein the second drive unit includes a second inverter and a second electric machine coupled to a second driveline, wherein the second driveline is arranged to transfer torque to a rear wheel of the vehicle; and
   wherein the high-voltage DC power bus is electrically connected to the first and second inverters; and
   a controller, arranged to monitor the high-voltage DC power bus, and in communication with and operatively connected to the first and second inverters, the controller including an instruction set, the instruction set being executable to:
   detect operation of one of the first inverter or the second inverter in an uncontrolled generation (UCG) mode,
   determine a driveline torque associated with the operating of the first inverter or the second inverter in the UCG mode,
   determine a compensating torque that is needed to counteract the driveline torque associated with the operating of the first inverter or the second inverter in the UCG mode, and
   control the other one of the first inverter or the second inverter based upon the compensating torque.

2. The vehicle of claim 1, wherein the instruction set being executable to detect operation of one of the first inverter or the second inverter in the uncontrolled generation (UCG) mode comprises the instruction set being executable to:
  monitor a first electric power output from the first inverter and monitor a second electric power output from the second inverter,
  detect operation of the first inverter in the UCG mode when the first electric power output from the first inverter is greater than a first threshold, and
  detect operation of the second inverter in the UCG mode when the second electric power output from the second inverter is greater than a second threshold.

3. The vehicle of claim 2, wherein the instruction set being executable to monitor a first electric power output from the first inverter, and detect operation of the first inverter in the UCG mode when the first electric power output from the first inverter is greater than a first threshold comprises the instruction set being executable to monitor a first voltage output from the first inverter, and detect operation of the first inverter in the UCG mode when the first voltage output from the first inverter is greater than a first threshold voltage, wherein the first threshold voltage is determined based upon a limit associated with the DC power source.

4. The vehicle of claim 2, wherein the instruction set being executable to monitor a first electric power output from the first inverter, and detect operation of the first inverter in the UCG mode when the first electric power output from the first inverter is greater than a first threshold comprises the instruction set being executable to monitor a first current output from the first inverter, and detect operation of the first inverter in the UCG mode when the first current output from the first inverter is greater than a first threshold voltage, wherein the first threshold current is determined based upon a limit associated with the DC power source.

5. The vehicle of claim 1, wherein the instruction set being executable to control the other one of the first inverter or the second inverter based upon the compensating torque comprises the instruction set being executable to control the other one of the first inverter or the second inverter to cancel the driveline torque being generated by the operating of the first inverter or the second inverter in the UCG mode.

6. The vehicle of claim 5, wherein the instruction set being executable to control the other one of the first inverter or the second inverter to cancel the driveline torque being generated by the operating of the first inverter or the second inverter in the UCG mode comprises the instruction set being executable to control the other one of the first inverter or the second inverter to control a net DC current on the high-voltage DC power bus within an allowable limit to prevent an over-voltage or over-current condition at the high-voltage DC power source.

7. The vehicle of claim 1, further comprising the instruction set being executable to disable operation of the first and second inverters in a regenerative braking mode.

8. A method for controlling a multi-mode powertrain system for a vehicle, comprising:
  arranging the multi-mode powertrain system to include a first inverter coupled to a first electric machine that is coupled to a first driveline, wherein the first driveline is arranged to transfer torque to a first wheel associated with a first axle of the vehicle, and a second inverter coupled to a second electric machine that is coupled to a second driveline, wherein the second driveline is arranged to transfer torque to a second wheel associated with a second axle of the vehicle, and wherein the first and second electric machines are electrically connected to a high-voltage bus;
  detecting operation of one of the first inverter or the second inverter in an uncontrolled generating (UCG) mode;
  determining a driveline torque associated with the operating of the one of the first inverter or the second inverter in the UCG mode;
  determining a compensating torque that is needed to counteract the driveline torque associated with the operating of the one of the first inverter or the second inverter in the UCG mode; and
  controlling the other of the first inverter or the second inverter based upon the compensating torque.

9. The method of claim 8, wherein detecting operation of one of the first inverter or the second inverter in the uncontrolled generation (UCG) mode comprises:
  monitoring a first electric power output from the first inverter and monitor a second electric power output from the second inverter;
  detecting operation of the first inverter in the UCG mode when the first electric power output from the first inverter is greater than a first threshold; and
  detecting operation of the second inverter in the UCG mode when the second electric power output from the second inverter is greater than a second threshold.

10. The method of claim 9, wherein monitoring a first electric power output from the first inverter, and detect operation of the first inverter in the UCG mode when the first electric power output from the first inverter is greater than a first threshold comprises monitoring a first voltage output from the first inverter, and detecting operation of the first inverter in the UCG mode when the first voltage output from the first inverter is greater than a first threshold voltage, wherein the first threshold voltage is determined based upon a limit associated with the high-voltage bus.

11. The method of claim 9, wherein monitoring a first electric power output from the first inverter, and detecting operation of the first inverter in the UCG mode when the first electric power output from the first inverter is greater than a first threshold comprises monitoring a first current output from the first inverter, and detecting operation of the first inverter in the UCG mode when the first current output from the first inverter is greater than a first threshold voltage, wherein the first threshold current is determined based upon a limit associated with the high-voltage bus.

12. The method of claim 8, wherein controlling the other one of the first inverter or the second inverter based upon the compensating torque comprises controlling the other one of the first inverter or the second inverter to cancel the driveline torque being generated by the operating of the first inverter or the second inverter in the UCG mode.

13. The method of claim 12, wherein controlling the other one of the first inverter or the second inverter to cancel the driveline torque being generated by the operating of the first inverter or the second inverter in the UCG mode comprises controlling the other one of the first inverter or the second inverter to control a net DC current on the high-voltage bus within an allowable limit to prevent an over-voltage or over-current condition.

14. The method of claim 8, further comprising disabling operation of the first and second inverters in a regenerative braking mode.

15. A multi-mode powertrain system for a vehicle, comprising:
- a first drive unit including a first inverter coupled to a first electric machine that is arranged to drive a first vehicle wheel;
- a second drive unit including a second inverter coupled to a second electric machine that is arranged to drive a second vehicle wheel;
- a high-voltage DC power bus connected to the first inverter and the second inverter, and electrically connected to a DC power source; and
- a controller, arranged to monitor the high-voltage DC power bus, and operatively connected to the first inverter and the second inverter, the controller including an instruction set, the instruction set being executable to:
  - detect operation of one of the first inverter or the second inverter in an uncontrolled generating (UCG) mode,
  - determine a driveline torque associated with the operating of the one of the first inverter or the second inverter in the UCG mode,
  - determine a compensating torque that is needed to counteract the driveline torque associated with the operating of the one of the first inverter or the second inverter in the UCG mode, and
  - control the other of the first inverter or the second inverter based upon the compensating torque.

16. The multi-mode powertrain system of claim 15, wherein the first vehicle wheel is disposed on one of a left side or a right side of the vehicle, and wherein the second vehicle wheel is disposed on the other of the left side or the right side of the vehicle.

17. The multi-mode powertrain system of claim 16, further comprising:
- the controller arranged to monitor the first drive unit and the second drive unit, and operatively connected to the first and second drive units; the controller including an instruction set, the instruction set being executable to:
  - detect a fault in the first drive unit, wherein the fault can induce unintended lateral motion (ULM) in the vehicle,
  - monitor a first rotational speed associated with the first vehicle wheel and a second rotational speed associated with the second vehicle wheel, and
  - control torque output from the second drive unit based upon the first rotational speed and the second rotational speed.

18. The multi-mode powertrain system of claim 17, wherein the instruction set is executable to determine that the first rotational speed is greater than a first threshold, and control the torque output from the second drive unit to be equal to zero in response.

19. The multi-mode powertrain system of claim 17, wherein the instruction set is executable to control torque output from the second drive unit to be equal to the torque output from the first drive unit when a difference between the first rotational speed and the second rotational speed is greater than a threshold speed.

20. The multi-mode powertrain system of claim 17, further comprising the instruction set being executable to detect a fault in the second drive unit when a difference between the first rotational speed and the second rotational speed is less than a threshold speed.

* * * * *